United States Patent
Guinn et al.

(10) Patent No.: US 9,746,381 B2
(45) Date of Patent: Aug. 29, 2017

(54) LASER INSTRUMENTATION BRACKET

(75) Inventors: Witt C. Guinn, Portland, CT (US); John J. Korzendorfer, Glastonbury, CT (US); David J. Sander, South Windsor, CT (US); Kelly A. Vanston, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 508 days.

(21) Appl. No.: 13/530,208

(22) Filed: Jun. 22, 2012

(65) Prior Publication Data

US 2013/0343066 A1 Dec. 26, 2013

(51) Int. Cl.
*G01K 1/14* (2006.01)
*F01D 17/08* (2006.01)
*G01K 11/12* (2006.01)
*G01K 13/02* (2006.01)

(52) U.S. Cl.
CPC ............. *G01K 1/14* (2013.01); *F01D 17/085* (2013.01); *G01K 11/12* (2013.01); *G01K 13/02* (2013.01); *F05D 2270/80* (2013.01); *G01K 2013/024* (2013.01); *Y10T 29/49778* (2015.01)

(58) Field of Classification Search
CPC ... G01J 1/04; G02B 26/10; G02B 6/36; F21V 21/00; B23Q 17/00
USPC ......... 250/208.1, 215, 216, 221, 222.1, 239, 250/552, 553; 362/257, 259, 362, 362/364–372, 546, 553, 632, 634; 257/431–433; 385/88–92
See application file for complete search history.

(56) References Cited

U.S. PATENT DOCUMENTS

| | | | |
|---|---|---|---|
| 4,003,200 A * | 1/1977 | Zerlauth | F01D 25/34 60/39.091 |
| 4,543,038 A * | 9/1985 | Kitaguchi | 415/112 |
| 4,544,839 A | 10/1985 | Weil et al. | |
| 4,562,769 A | 1/1986 | Heynau et al. | |
| 4,728,787 A | 3/1988 | Henry et al. | |
| 5,157,684 A | 10/1992 | Benda et al. | |
| 5,189,689 A | 2/1993 | Fabian | |
| 5,325,455 A * | 6/1994 | Henson | G02B 6/3817 385/137 |
| 5,387,969 A | 2/1995 | Marantette | |
| 5,450,245 A * | 9/1995 | Grotzinger | G02B 7/02 359/819 |
| 5,576,826 A * | 11/1996 | Hamar | G01B 11/27 33/286 |
| 5,711,603 A | 1/1998 | Ringermacher et al. | |
| 6,725,551 B1 | 4/2004 | Sutton | |
| 6,905,419 B1 | 6/2005 | Yeh | |
| 2003/0223702 A1* | 12/2003 | Mitchell | 385/76 |
| 2009/0201971 A1 | 8/2009 | Goldammer et al. | |
| 2009/0320609 A1* | 12/2009 | Xia | G01H 9/004 73/862.08 |
| 2011/0222582 A1 | 9/2011 | Subramanian et al. | |

* cited by examiner

*Primary Examiner* — Francis M Legasse, Jr.
*Assistant Examiner* — Don Williams
(74) *Attorney, Agent, or Firm* — Carlson, Gaskey & Olds, P.C.

(57) ABSTRACT

An exemplary laser instrumentation bracket includes a support structure providing a recess configured to receive a collar of a laser housing. The laser housing has a main body extending axially through an aperture of the support structure when the recess receives the collar.

19 Claims, 5 Drawing Sheets

LASER INSTRUMENTATION BRACKET

STATEMENT REGARDING FEDERALLY SPONSORED RESEARCH OR DEVELOPMENT

This invention was made with government support under Contract No. F33657-91-C-0007 awarded by the United States Air Force. The Government has certain rights in this invention.

BACKGROUND

This disclosure relates generally to a laser instrumentation system and, more particularly, to adjustably supporting components of the laser instrumentation system.

Laser-based thermometry systems are a type of laser instrumentation system. In laser-based thermometry systems, a laser emitter communicates a laser to a laser receiver. Temperatures are then measured using the laser.

In some examples, laser-based thermometry systems are used to measure temperatures within a turbomachine, such as temperatures within a gas path of an augmentor igniter. In such examples, the laser emitter and laser receiver are located on opposing radial sides of the gas path. Aligning the laser emitter relative to the laser receiver is challenging.

SUMMARY

A laser instrumentation bracket according to an exemplary embodiment of the present disclosure includes, among other things, a support structure providing a recess configured to receive a collar of a laser housing. The laser housing has a main body extending axially through an aperture of the support structure when the recess receives the collar.

In a further non-limiting embodiment of the foregoing laser instrumentation bracket, the support structure may be a first support structure configured to be secured to a second support structure to clamp the collar between the first support structure and the second support structure when the recess receives the collar.

In a further non-limiting embodiment of either of the foregoing laser instrumentation brackets, the laser housing may extend axially through an aperture of the second support structure when the collar is clamped between the first support structure and the second support structure.

In a further non-limiting embodiment of any of the foregoing laser instrumentation brackets, the laser housing may extend axially through the aperture of the second support structure toward a flowpath of a turbomachine.

In a further non-limiting embodiment of any of the foregoing laser instrumentation brackets, the laser housing may comprise a laser receiver housing.

In a further non-limiting embodiment of any of the foregoing laser instrumentation brackets, a radial position of the laser housing may be adjusted when the laser housing extends axially through the aperture.

In a further non-limiting embodiment of any of the foregoing laser instrumentation brackets, the collar may extend radially from the main body.

In a further non-limiting embodiment of any of the foregoing laser instrumentation brackets, the recess may be oversized relative to the collar and the aperture may be oversized relative to the main body such that the collar is radially adjustable away from a centered position within the recessed area.

In a further non-limiting embodiment of any of the foregoing laser instrumentation brackets, the collar may contact a floor of the recess to limit axial movement of the laser housing through the aperture.

A laser instrumentation system according to another exemplary embodiment of the present disclosure includes, among other things, a laser emitter assembly, a laser receiver assembly configured to receive at least one laser from the laser emitter assembly, and a bracket that supports the laser emitter assembly or the laser receiver assembly within a recessed area. The supported one of the laser emitter assembly or laser receiver assembly is adjustable within the recessed area relative to the other one of the laser emitter assembly or laser receiver assembly.

In a further non-limiting embodiment of the foregoing laser instrumentation system, the laser emitter assembly and the laser receiver assembly may be located on opposing radial sides of a flowpath within a turbomachine.

In a further non-limiting embodiment of either of the foregoing laser instrumentation systems, the laser emitter assembly and the laser receiver assembly may be located within any exhaust system hardware of a turbomachine.

In a further non-limiting embodiment of any of the foregoing laser instrumentation systems, the laser may communicate through any exhaust system hardware.

In a further non-limiting embodiment of any of the foregoing laser instrumentation systems, the laser emitter assembly and the laser receiver assembly may be portions of a laser thermometry system.

A laser alignment method according to another exemplary embodiment of the present disclosure includes, among other things, holding a laser housing in a first position within a recess of a bracket, moving the laser housing to a second position within the recess of the bracket, and holding the laser housing in the second position. A laser emitter and a laser receiver are misaligned when the laser housing is in the first position, and the laser emitter and the laser receiver are aligned when the laser housing is in the second position.

In a further non-limiting embodiment of any of the foregoing laser alignment methods, the method may include measuring a temperature using a laser communicated from the laser emitter to the laser receiver.

In a further non-limiting embodiment of any of the foregoing laser alignment methods, the temperature may be a temperature of a flowpath within a turbomachine.

In a further non-limiting embodiment of any of the foregoing laser alignment methods, a collar of the laser housing may contact a floor of the recess to hold the laser housing in the first position and the second position.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
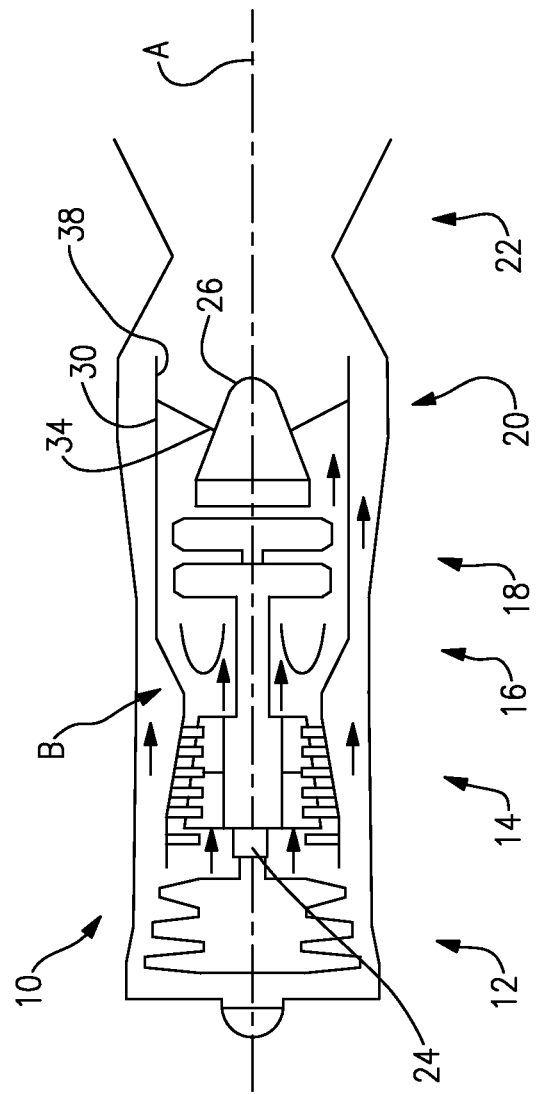
FIG. 1 shows a schematic side view of an example turbomachine.

Referring to FIG. 1, an example turbomachine 10 includes a fan section 12, a compressor section 14, a combustor section 16, a turbine section 18, an augmentor section 20, and an exhaust section 22. The compressor section 14, combustor section 16, and turbine section 18 are generally referred to as the core engine. An axis A extends longitudinally through the turbomachine 10.

Although depicted as a two-spool gas turbine engine in the disclosed non-limiting embodiment, it should be understood that the concepts described herein are not limited to use with such two-spool designs. That is, the teachings may be applied to other types of turbomachines and gas turbine engines, including three-spool architectures.

In the example turbomachine 10, flow moves from the fan section 12 to a bypass flowpath. Flow from the bypass flowpath generates forward thrust. The compressor section 14 drives flow along a core flowpath. Compressed air from the compressor section 14 communicates through the combustor section 16. The products of combustion are expanded through the turbine section 18.

In some examples, the turbomachine 10 may incorporate a geared architecture 24 that allows a fan of the fan section 12 to rotate at a different speed than a turbine that is driving the fan. The geared architecture 24 may include an epicyclic geartrain, such as a planetary geartrain, or some other gear system.

Figure 2:
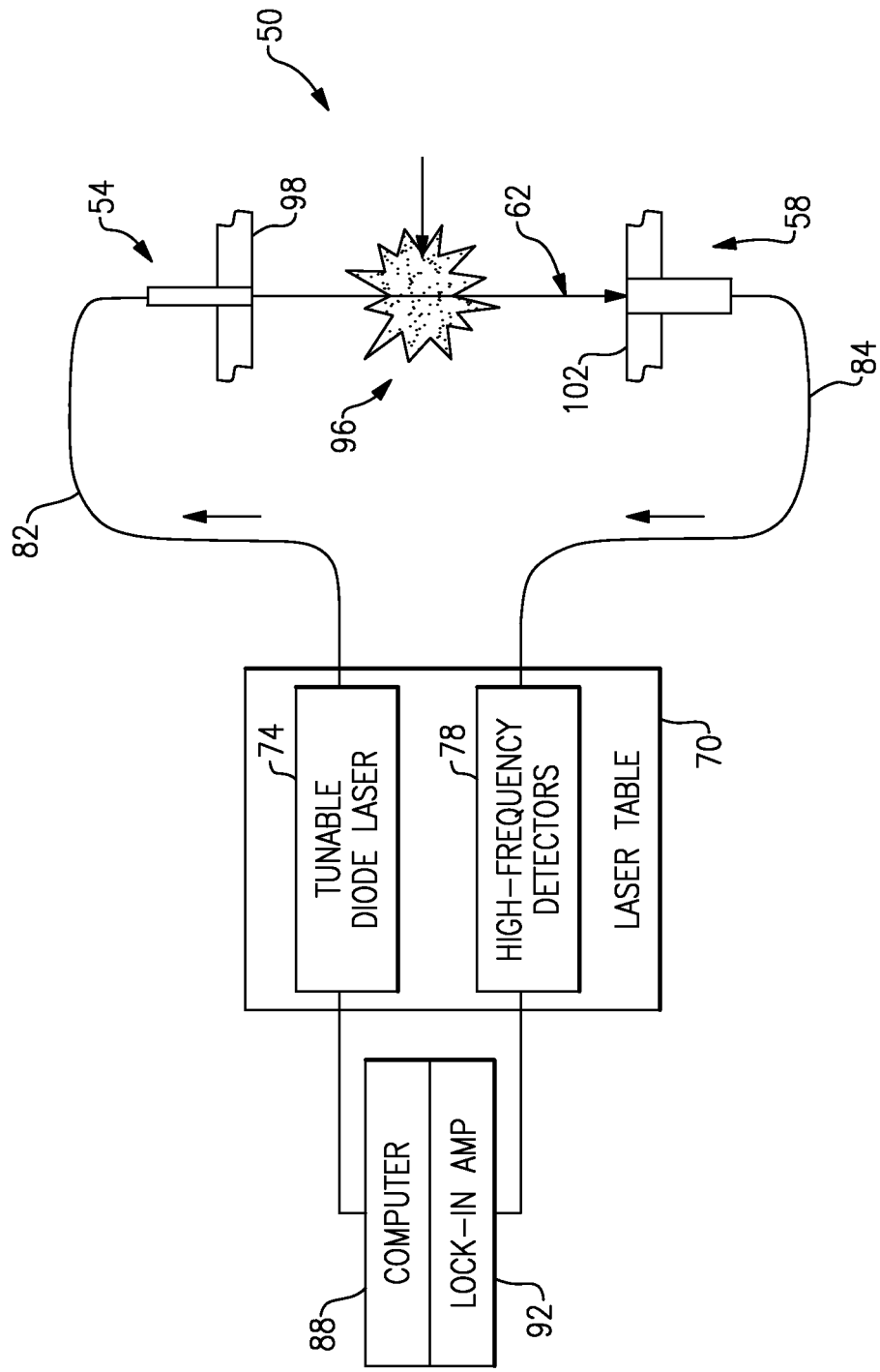
FIG. 2 shows a schematic view of an example laser instrumentation system.

Referring now to FIG. 2 with continuing reference to FIG. 1, an example laser instrumentation system 50 may be incorporated into the turbomachine 10. In this example, the laser instrumentation system 50 measures temperatures.

The laser instrumentation system 50 includes a laser emitter assembly 54 and a laser receiver assembly 58. One or more light emitting lenses may be integrated into the laser emitter assembly 54 and the laser receiver 58 assembly.

The example laser instrumentation system 50 also includes a laser table 70 having a tunable diode laser 74 and high frequency detectors 78. A fiber-optic cable 82 operatively links the tunable diode laser 74 to the laser emitter assembly 54. A fiber-optic cable 84 operatively links the laser receiver assembly 58 to the high frequency detectors 78. A computer 88 and a lock-in amp 92 are operatively connected to the tunable diode laser 74 and the high frequency detectors 78.

During operation, one or more lasers 62 propagates from the laser emitter assembly 54. The lasers 62 are received by the laser receiver assembly 58 when the system 50 and when the laser emitter assembly 54 are aligned with the laser receiver assembly 58.

In this example, the laser 62 is communicated across a flowpath 96 within the augmentor section 20 of the turbomachine 10. The laser emitter assembly 54 is mounted to an exhaust system component 106, and the laser receiver assembly 58 is mounted to a radially inner wall 102.

When the laser 62 is received by the laser receiver assembly 58, the laser instrumentation system 50 is used to measure real-time temperatures within the flowpath 96 of the operating turbomachine 10. A person having skill in this art and the benefit of this disclosure would comprehend how to measure real-time temperatures utilizing the laser instrumentation system 50.

Figure 3:
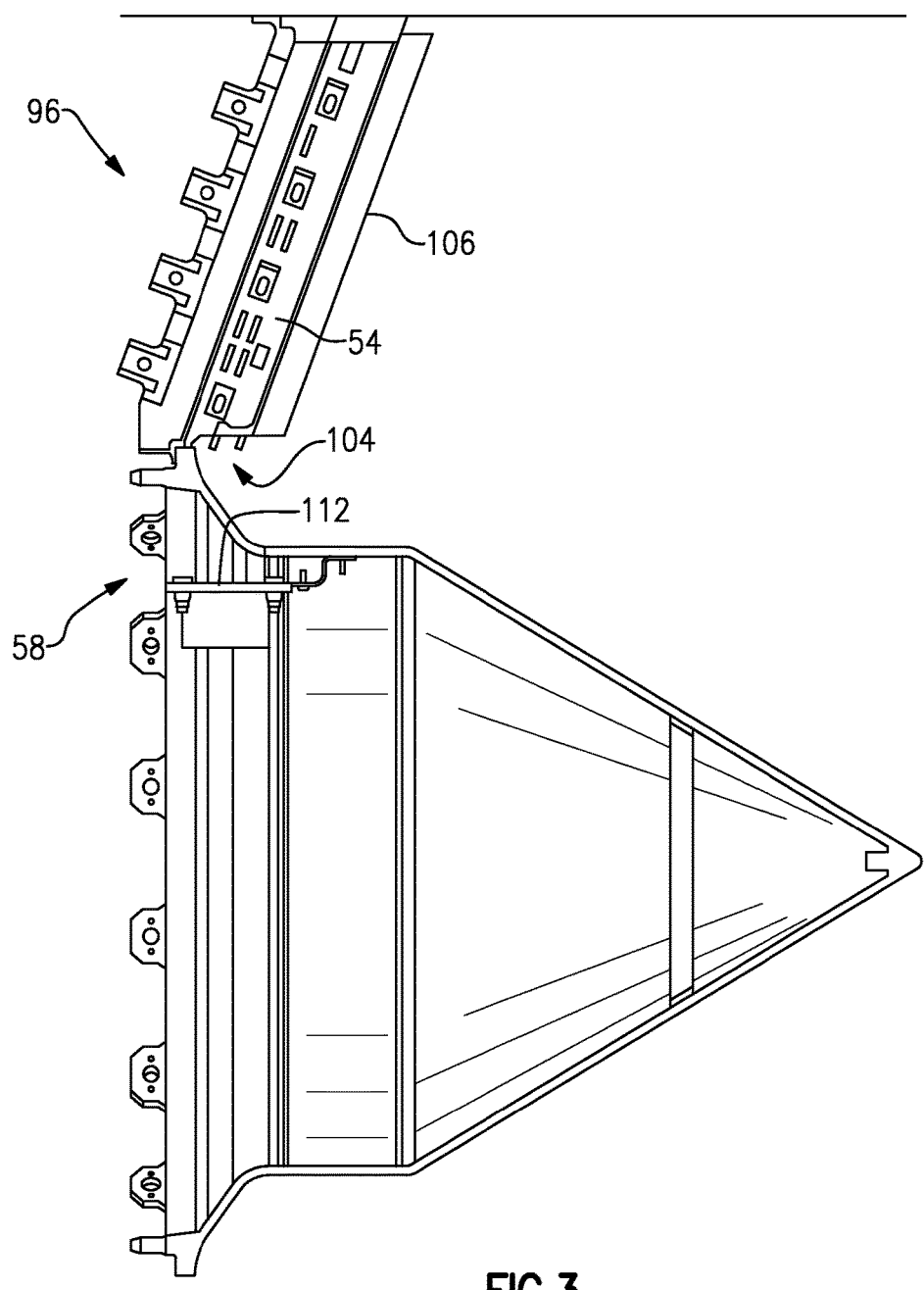
FIG. 3 shows a side view of the laser instrumentation system of FIG. 2 within the turbomachine of FIG. 1.
Figure 4:
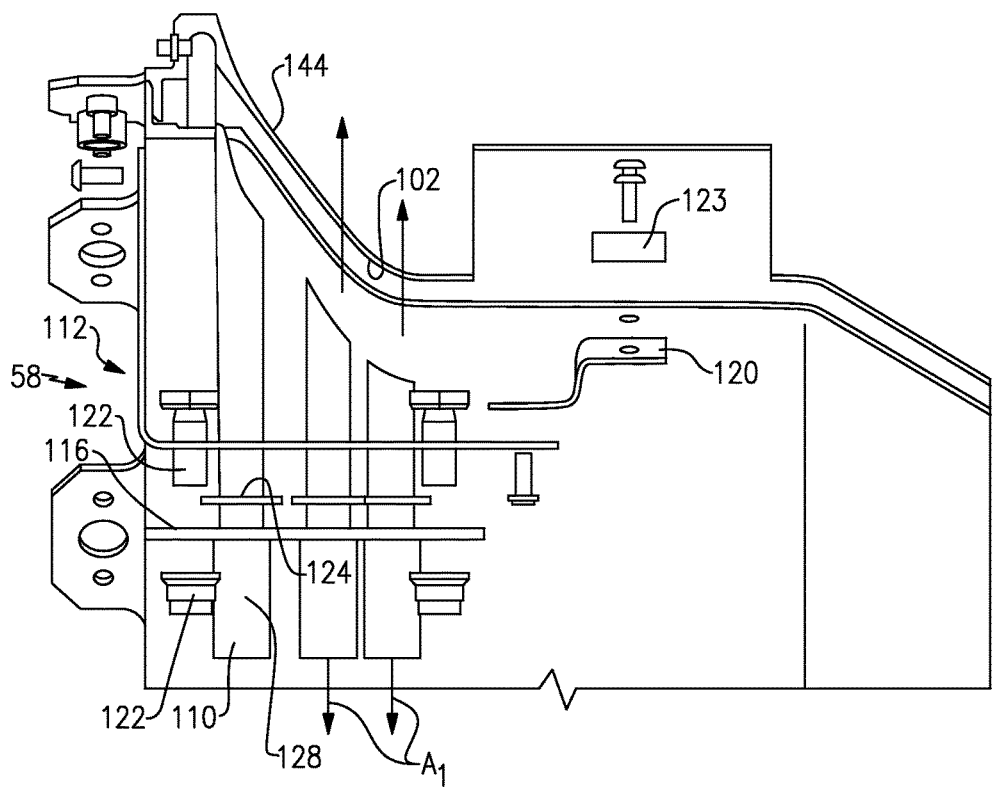
FIG. 4 shows a close-up side view of a laser receiver system of FIG. 3.
Figure 5:
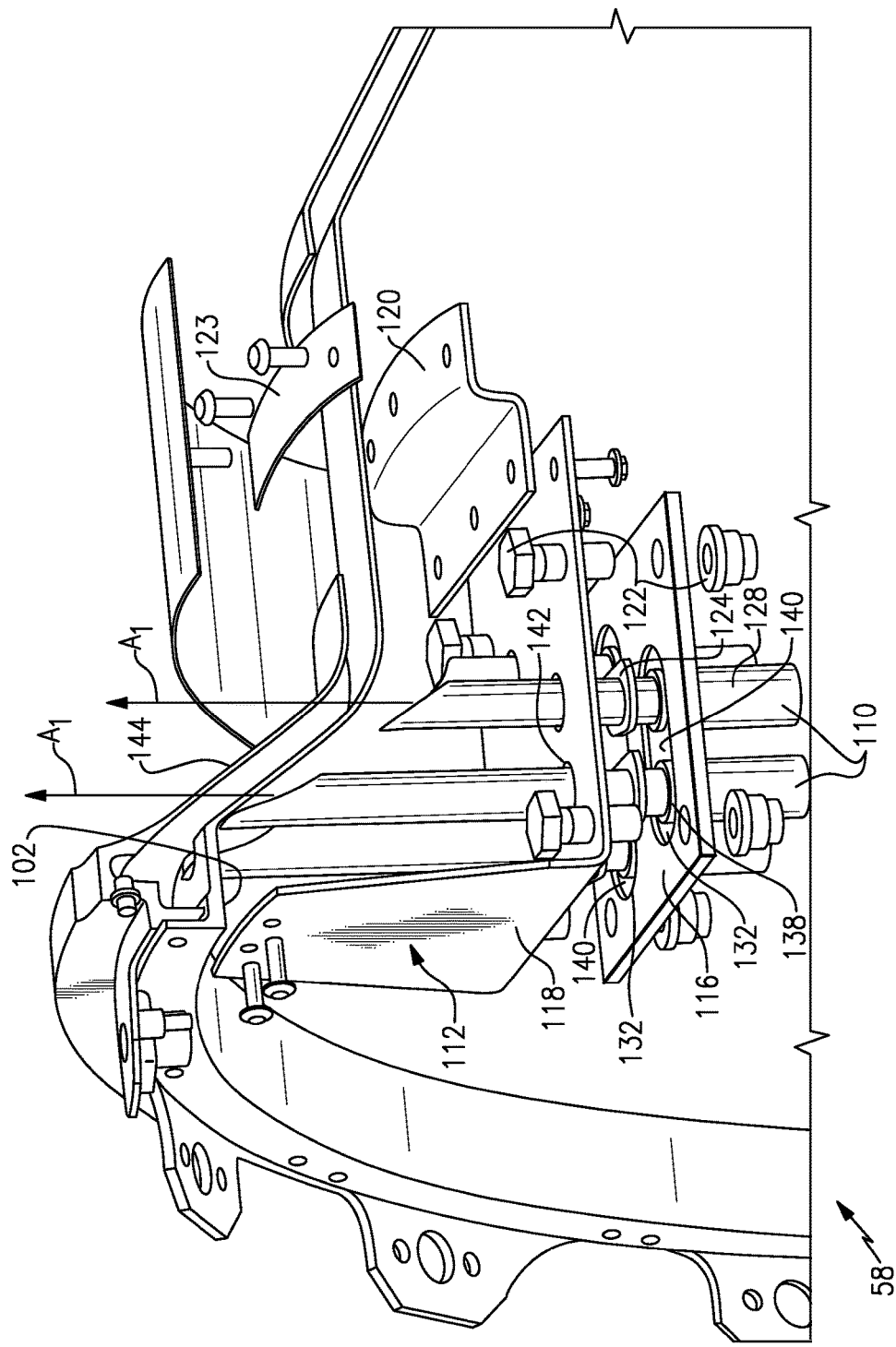
FIG. 5 shows a perspective view of the laser receiver system of FIG. 4.

Referring now to FIGS. 3-5 with continuing reference to FIGS. 1 and 2, the laser emitter assembly 54, in some examples, includes four separate laser housings 104 each configured to communicate a laser beam through an exhaust system component 106 extending radially across the flowpath 96. The individual laser beams from the laser housings 104 are received by four laser housings 110 of the laser receiver assembly 58.

Notably, after the laser housings 104 of the laser emitter assembly 54 are secured relative to the exhaust hardware 106, it can be difficult to adjust the laser housings 110 of the laser receiver assembly 58 into an appropriate laser receiving position. Similarly, if the laser housings 110 of the laser receiver assembly 58 are secured relative to the inner wall 102, it can be difficult to adjust the laser housings 104 of the laser emitter assembly 54 into an appropriate laser propagating position. The example laser instrumentation system 50 includes a laser instrumentation bracket assembly 112 that permits adjustments of the laser housings 110.

The example bracket assembly 112 includes three separate support structures 116, 118, and 120. The structures 118 and 120 are fastened directly to the radially inner wall 102 with mechanical fasteners, such as rivets, or another suitable attachment strategy. This example attachment strategy rivets the structure 120 to a doubler plate 123. The support structure 116 is fastened directly to the support structure 118 using mechanical fasteners 122.

The laser housings 110 each extend longitudinally along an axis $A_1$. The laser housings 110 each include collars 124 extending radially from a main body portion 128 of the laser housings 110. In this example, the collars 124 of the laser housings 110 are clamped between the support structure 116 and the support structure 118 when the support structure 116 is fastened to the support structure 118.

When the laser receiver assembly 58 is installed, the example collars 124 are each received within recessed areas 132 of the support structure 116. The collars 124 directly contact floors 140 of the recessed areas 132 to limit axial movement of the laser housings 110 in a first direction. Axial, in this example, is with reference to the axis $A_1$. The opposing side of the collars 124 directly contacts the support structure 118 to limit axial movement of the laser housings 110 in a second, opposite direction. The support structure 118 may include recessed areas instead of, or in addition to, the support structure 116. The recessed areas 132 may be non-circular or circular. Any number of the recessed areas 132 may be used.

The example recessed areas 132 are oversized relative to the collars 124. That is, the radial width of the recessed areas 132 is greater than the diameter of the collar 124 received within that recessed area 132. In some specific examples, the collars 124 are able to radially move within the recessed area 132 away from a centered position within the recessed area 132.

When the laser receiver assembly 58 is installed, the main body portions 128 of each of the laser housings 110 extend through both an aperture 138 in the support structure 116 and an aperture 142 in the support structure 118. The main body portions 128 extend through the apertures 142 toward the flowpath 96. The main body portions 128 terminate near the flowpath 96. Notably, no attachment features extend to the flowpath 96, which would potentially disturb flow and cause measurement inaccuracies.

The apertures 138 and 142 are each oversized relative to the received one of the main body portions 128 of the laser housings 110. That is, the respective diameters of the apertures 138 and 142 are both greater than the diameter of the main body portions 128 of the laser housings 110. In some specific examples, each of the laser housings 110 is able to be moved radially away from a center of the apertures 138 and 142.

In this example, each of the laser housings 110 is moved radially while the collar 124 is within the recessed area 132 until the laser housing 110 is in a position appropriate for receiving a laser beam from an associated laser housing 104 of the laser emitter assembly 54. The mechanical fasteners 122 are then fully tightened to secure the support structure 116 to the support structure 118 and prevent movement of the laser housings 110 relative to the bracket assembly 112 during engine operation.

Although the example bracket assembly 112 is shown supporting the laser housings 110, the bracket assembly 112 could also be used to adjustably hold the laser housings 104 associated with the laser emitter assembly 54.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A laser instrumentation bracket, comprising:
a support structure providing a recess having a floor, the recess configured to receive a collar of a laser housing, the laser housing having a main body extending axially through an aperture of the support structure when the recess receives the collar against the floor, wherein the collar is directly joined to the main body wherein the laser housing extends axially through the aperture of the support structure toward a flowpath of a turbomachine.

2. The laser instrumentation bracket of claim 1, wherein the support structure is a first support structure configured to be secured to a second support structure to clamp the collar between the first support structure and the second support structure when the recess receives the collar.

3. The laser instrumentation bracket of claim 2, wherein the laser housing extends axially through an aperture of the second support structure when the collar is clamped between the first support structure and the second support structure.

4. The laser instrumentation bracket of claim 1, wherein the laser housing comprises a housing within a laser receiver assembly.

5. The laser instrumentation bracket of claim 1, wherein a radial position of the laser housing can be adjusted when the laser housing extends axially through the aperture.

6. The laser instrumentation bracket of claim 1, wherein the collar extends radially from the main body.

7. The laser instrumentation bracket of claim 1, wherein the recess is oversized relative to the collar and the aperture is provided within the floor, the aperture oversized relative to the main body such that the collar is radially adjustable away from a centered position within the recessed area.

8. The laser instrumentation bracket of claim 1, wherein the collar contacts a floor of the recess to limit axial movement of the laser housing through the aperture.

9. The laser instrumentation bracket of claim 1, wherein the collar and the main body are portions of a single continuous structure.

10. A laser instrumentation system, comprising:
a laser emitter assembly;
a laser receiver assembly configured to receive at least one laser from the laser emitter assembly;
a bracket that supports a collar extending directly from a housing of the laser emitter assembly or the laser receiver assembly within a recessed area, the collar positioned against a floor of the recessed area when supported by the bracket, wherein the supported one of the laser emitter assembly or laser receiver assembly is adjustable within the recessed area relative to the other one of the laser emitter assembly or laser receiver assembly wherein the housing extends axially through an aperture of the bracket toward a flowpath of a turbomachine.

11. The laser instrumentation system of claim 10, wherein the laser emitter assembly and the laser receiver assembly are located on opposing radial sides of a flowpath within the turbomachine.

12. The laser instrumentation system of claim 10, wherein the laser emitter assembly and the laser receiver assembly are located within exhaust system hardware of the turbomachine.

13. The laser instrumentation system of claim 10, wherein the at least one laser communicates through exhaust system hardware.

14. The laser instrumentation system of claim 10, wherein the laser emitter assembly and the laser receiver assembly are portions of a laser thermometry system.

15. The laser instrumentation system of claim 10, wherein the collar and the housing are portions of a single continuous structure.

16. The laser instrumentation system of claim 10, wherein the aperture is provided within the floor.

17. A laser alignment method, comprising:
holding a collar of a laser housing in a first position within a recess of a bracket, the collar and laser housing of a single continuous structure;
moving the collar and the laser housing to a second position within the recess of the bracket, the collar held against a floor of the recess in the first position and in the second position; and
holding the collar and the laser housing in the second position, wherein a laser emitter and a laser receiver are misaligned when the laser housing is in the first position, and the laser emitter and the laser receiver are aligned when the laser housing is in the second position wherein the laser housing extends axially through an aperture of the bracket toward a flowpath of a turbomachine.

18. The laser alignment method of claim 17, including measuring a temperature using a laser communicated from the laser emitter to the laser receiver.

19. The laser alignment method of claim 18, wherein the temperature is a temperature of the flowpath within the turbomachine.

* * * * *